C. C. KROUSE.
ART OF TANNING.
APPLICATION FILED JUNE 20, 1919.

1,338,307. Patented Apr. 27, 1920.

Inventor:
Charles C. Krouse.

Attys.

UNITED STATES PATENT OFFICE.

CHARLES CLEMENT KROUSE, OF WILLIAMSPORT, PENNSYLVANIA.

ART OF TANNING.

1,338,307.  Specification of Letters Patent.  Patented Apr. 27, 1920.

Substitute for application Serial No. 170,084, filed May 31, 1917, a renewal of application No. 20,877, filed April 12, 1915. This application filed June 20, 1919. Serial No. 305,460.

*To all whom it may concern:*

Be it known that I, CHARLES C. KROUSE, of Williamsport, Pennsylvania, have invented certain new and useful Improvements in the Art of Tanning, of which the following is a specification, this application being a substitute for No. 170,084, filed May 21, 1917, which was a renewal of No. 127,966, filed October 26, 1916, which in turn was a renewal of No. 92,311, filed April 19, 1916, this latter being a renewal of No. 20,877, filed April 12, 1915.

My present invention relates to improvements in the process of extracting fat from raw hides and skins preparatory to tanning, and has among others for its objects to provide a preliminary treatment of the raw or pickled skins which not only enables them to be more quickly and effectually subjected to the action of the tanning liquid, but which will produce a superior grade of leather.

The raw hides and skins of animals, and notably pig and sheep skins, contain a large quantity of animal fat or grease, which is repellent to tannic acid or tanning liquor, and in the usual process of tanning some means is generally employed to neutralize as much of the excess fat as possible, as for instance by immersing for a long time in a solution of lime, with additional manipulation by hand when the skins have an excessive quantity of fat; or by drumming the skins in a solution of caustic soda.

By my present invention I limit the liming process only to the action of distending the skin fibers, known as "plumping" which may also be done with acids; or I may do away with the liming process all together. I remove all excess fat or grease from the raw skins, making them more receptive to the tanning liquor which quickly and thoroughly penetrates the interstices or pores of the skins and acts more efficiently upon them to produce leather of superior quality and strength.

My present invention is particularly advantageous in connection with skins which, after being tanned, are to be colored, or to be provided with a coating of enamel or like finish for gloves or shoe uppers, such as sheep or goat skins. Heretofore it has been regarded as necessary to subject the tanned skins or hides to an extraction process before such uniformly fine coloring or enamel finish could be produced, but by my invention the tanned skin is susceptible without further treatment to uniform coloring, fine enameling or similar finish.

With the foregoing, and other objects in view, my invention includes the novel method or process hereinafter described and particularly defined by the appended claims.

According to my invention I extract the excess grease or animal fat from the raw or pickled and untanned skins, without loss of collogen or otherwise depleting or damaging the skins, by means of a suitable grease solvent.

The preferred manner of carrying out my improved process will be described in connection with the accompanying drawing showing an apparatus capable of carrying out the process, such apparatus being representative of any suitable plant, and forming *per se* no part of the present invention.

Figure 1:
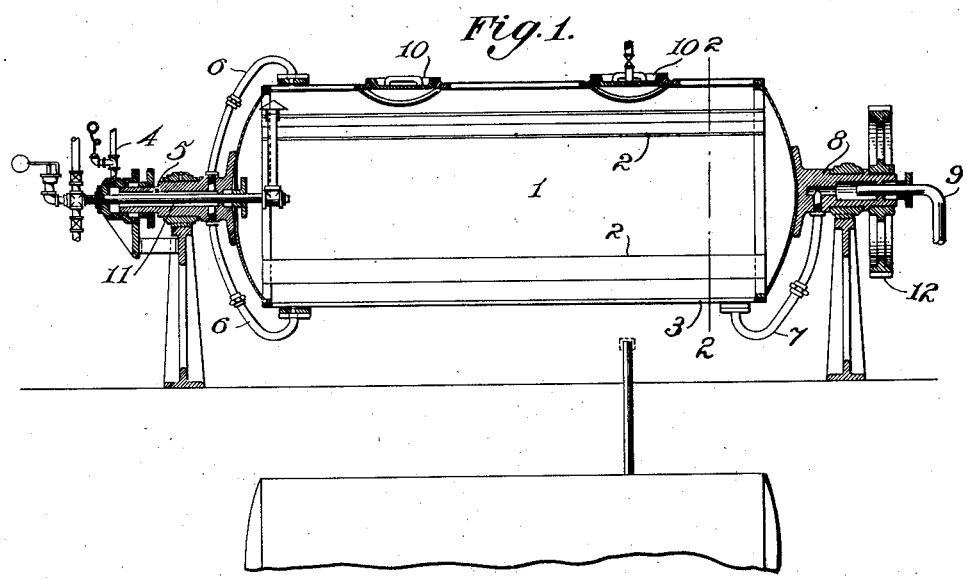
Figure 1 is a longitudinal sectional view.
Figure 2:
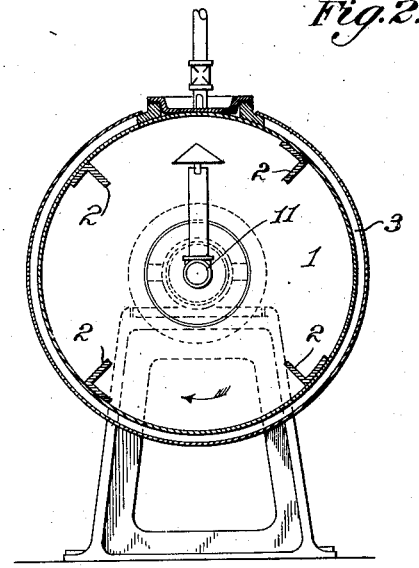
Fig. 2 is a section on line 2—2 of Fig. 1.

In this drawing the numeral 1 designates a rotary vessel or drum built to withstand inner and outer pressures and provided preferably with ribs 2 projecting from its inner periphery. The drum is provided with a jacket 3 for heating purposes to which steam or hot water may be supplied from a supply pipe 4 passing through the hollow trunnion 5, which communicates by pipes 6 with the jacket, the outflow from the jacket being by pipe or pipes 7 through the hollow trunnion 8 at the opposite end of the drum and outlet pipe 9.

The drum is provided with one or more manholes 10 for the insertion and removal of the skins. Through the hollow trunnion passes a pipe 11, which pipe is connected by branch pipes with a vacuum pump, source of solvent solution, drain receptacle and source of air supply which may or may not be under pressure, according to whether it is desired to have pressure at or above atmospheric pressure as hereinafter described, those sources for convenience of illustration being omitted.

The drum may be rotated from any source of power applied to the wheel indicated at 12. In carrying out my improved process by the apparatus as described and according to the preferred manner, I first cleanse the skins by the usual method of washing or soaking. If received in the hair, bristles, or short wool, I then depilate them by immersion or drumming in a sodium sulfid solution which causes the hair to dissolve, after which they are again washed in water to free them from sodium sulfid. Other methods of depilation may be used, for instance a paste mixture of lime and sodium sulfid spread upon the hair which dissolves it, followed by a washing. The usual method of liming for depilation may be employed if desired. I then load the skins into the drum through the manhole, which is then closed, and slowly revolve the drum, the vacuum pump being started, and steam or hot water being turned into the jacket. In the vacuum thus created, the water or moisture is evaporated from the revolved skins at a temperature below that at which the skins will be damaged, to wit; at about or below 120 degrees Fahrenheit, as a temperature exceeding this will melt the collogen in the skins. The skins are thus dehydrated to within from 5% to 20% of absolute dryness. The supply of heat is then cut off, the rotation of the drum stopped, and a charge of solvent is drawn into the drum, which may conveniently be done by simply utilizing the vacuum which exists within the drum. Other methods of dehydrating wet skins may be employed, for instance drumming them in a water absorbing material such as methyl alcohol. By this method after the skins are placed in the drum and the manhole is closed, denatured alcohol is pumped into the drum. The drum is slowly revolved for one and one-half hours, after which it is stopped, the water saturated alcohol is drained into a still for redistillation, separation and re-use. To evaporate residual alcohol from the skins, vacuum is created within the drum, the drum is slowly revolved, and heat is applied through the jacket. The resultant alcohol vapor is then passed through a cooler or condenser, and the condensed vapor or liquid flows into a storage tank for reuse. It is not essential that all skins be dehydrated for effectual degreasing. In some cases they may simply be passed through a rolling machine, which squeezes out the excess water and loosens or breaks the oil cells, bringing them into condition for effectual degreasing.

Any approved grease solvent may be used such as naphtha, but I prefer trichlorethylene because of its density (specific gravity 1.47), and its noninflammability. After the tank or drum has received the charge of solvent and is again started in motion, the slow rotation of the drum, aided by the longitudinal ribs therein, agitate the skins and solvent by tumbling which facilities penetration. By employing a solvent of specific gravity heavier than water, such as that above specified, the resultant pressure has a tendency to press the remaining water out of the skins and more freely admit the solvent, requiring the skins to be less dehydrated than when a less dense solvent is used. After the grease or fat is largely dissolved from the skins and the rotation of the drum is stopped, the grease laden solvent is drained into a still, and fresh solvent is admitted, and the operation repeated until all of the excess grease is removed from the skins.

Rotation is then again started and the vacuum recreated if broken while draining, and the jacket is heated to a degree below that at which the skins will be injured. The low heat coupled with the vacuum causes quick evaporation of the residual solvent at a temperature which precludes injury to the skins, the vapor passing through the vacuum pump to a condenser where it is again turned into a liquid and goes into the storage tank for reuse. The grease laden solvent may be distilled in the usual manner to separate grease and solvent, the solvent being condensed into liquid for reuse, and the grease recovered as a by-product for refining and marketing. The skins are unloaded from the drum as free from grease as desired, practically dry, and ready for the tanning process.

If the extracting drum be lead lined or otherwise protected to prevent the tannic acid from coming into contact with iron, the tanning process could be carried out in the same drum without removing the skins but for economic reasons it should be accomplished in a separate apparatus.

At this stage the hides or skins are, as above stated, as free from grease as desired, practically dry, and in a receptive condition for tanning liquor, not being hard or bony like " dry hides or skins " which have been subjected to tropical sun drying.

The succeeding tanning operation may be by various methods, depending upon the kinds of hides or skins and the uses to which the leather is to be put; for instance, vegetable tanning (oak or hemlock) or mineral tanning (chrome or alum) or a combination of both, with or without a wax filling for water proofing, etc.

I do not claim that my process is of special benefit in preparing low fat-bearing hides or skins for tanning; such as cattle and horse hides, as the fat content is not sufficient to seriously interfere with the tanning process, but it is especially applicable to hog, sheep and seal skins. It is also applicable to goat skins.

Raw hides and skins may be divided into three general classes, depending on the natural animal fat content which largely determines the quality of leather after tanning by the usual processes.

A. Low percentage of fat—2% to 5%; approximately cattle and calves, horses and colts, deer, etc.

B. Medium percentage of fat—8% to 15%, approximately goat and kid.

C. High percentage of fat—15% to 25%, approximately hogs and pigs, sheep and lambs, seal, etc.

Similarly, the strength or toughness, and consequent utility of leather, is largely determined by proportion of natural animal fat contained in the raw hides and skins. Fat or grease repels tanning liquor, and tannic acid will not mix or combine with fat. With a small proportion of fat in hides or skins, tanning liquor will penetrate and the tannic acid will combine with collogen, making tough strong leather; but in proportion to the larger percentage of fat in raw hides or skins the less will tanning -liquor penetrate, and the less efficiently will tannic acid and collogen combine. Therefore generally, the less fat contained in hides or skins, or the more fat removed before tanning, the more easily the tanning operation can be performed, but it is not alone a question of ease and economy in tanning, but the different and better result of obtaining strong leather from so-called inferior hides or skins that would otherwise yield only weak leather. An illustration of this is the use of sheep skin leather in imitation of kid (goat) gloves. The only practical difference between goat and sheep skin leather is that one is relatively strong and the other relatively weak. Sheep skin leather is relatively weak, largely because of imperfect tannage due to a large proportion of fat. For the same reason the market price for raw sheep skins is less than for goat skins. As a general practice, hogs are not now skinned, and the world's largest possible supply of animal skins suitable for leather is now practically lost to the markets and to the public, at a time when there is a world-wide shortage of hides and skins, simply because hog skins contain a large proportion of fat and will not yield good leather without practical degreasing.

The largest general use for leather is in the manufacture of shoes—uppers and soles—for which leather made from low fat-bearing skins is most suitable; such as cattle, calf, horse, and colt, although for the kinds of shoes that do not require specially strong leather, medium fat bearing skins are used, such as goat and kid. In the latter case the skins are almost invariably degreased after they are tanned, to permit coloring or enameling, which treatment does not increase the strength of the leather. My process of degreasing raw skins preparatory to tanning brings hog skins into condition to be thoroughly tanned, and makes them available for shoe upper and sole leather, with a strength and wearing quality equal to or superior to leather made from cattle hides.

Hides or skins containing from 2% to 5% fat yield strong leather;

Hides or skins containing from 8% to 15% fat yield relatively weak leather;

Hides or skins containing from 15% to 25% fat yield leather with little strength.

Forty consecutive laboratory tests, to determine fat in raw hog skins, before and after degreasing, showed percentage of fat;

Before degreasing—from 12% to 38%.

After degreasing—from ½% to 2¼%.

For practical tanning to obtain good strong leather from hog skins I reduce the fat to about 2% preferably, although good strong leather may be made with fat content somewhat higher.

I claim:—

1. The herein described method of treating raw hides and skins, containing a high percentage of fat, preparatory to tanning, consisting in adding to the hides and skins sufficient quantity of grease solvent to dissolve the grease so that when the solvent is withdrawn it carries enough of the grease with it to bring the skins into a condition for tanning to produce strong leather, substantially as described.

2. The herein described method of treating raw hog skins preparatory to tanning, consisting in adding to such skins a sufficient quantity of grease solvent to dissolve such a proportion of the grease that when the solvent is withdrawn it carries with it enough grease to leave the skins in condition for tanning to produce strong leather.

3. The herein described method of treating raw hides and skins preparatory to tanning, consisting in extracting the fat from said hides and skins by a volatile solvent and evaporating the residual solvent from the hides and skins while maintaining a temperature below that at which the collogen in the skins will melt, substantially as and for the purpose set forth.

4. The herein described method of treating raw hides and skins, which originally contained from 8% to 38% of fat, preparatory to tanning, consisting in extracting the fat from said hides and skins by a volatile solvent down to a maximum of 5% remaining in the hides and skins, and evaporating the residual solvent from the hides and skins while maintaining a temperature below that at which the collogen in the skins will melt.

5. The herein described method of treating hog skins preparatory to tanning, consisting in extracting the fat from said skins, so as to leave therein not more than 5% by the use of a volatile solvent, and then evaporating the residual solvent at a temperature below that at which the collogen in the skins will melt.

6. The herein described method of treating raw hides and skins containing a high percentage of fat which consists in adding to such raw hides and skins a sufficient quantity of volatile grease solvent to dissolve sufficient grease to leave the skins in condition for tanning, withdrawing said solvent, and thereafter tanning the skins.

7. The herein described method of treating raw hides and skins, which originally contained between 8% and 38% of fat, preparatory to tanning, which comprises dehydrating the skins *in vacuo*, agitating them in a body of volatile solvent, withdrawing the grease laden solvent, adding fresh solvent and repeating the operation until sufficient grease is drawn off with the solvent to fit the skins for tanning to produce strong leather.

8. The herein described method of treating raw hides and skins containing a high percentage of fat, preparatory to tanning, consisting in dehydrating the hides and skins, and thereafter adding to them a sufficient quantity of grease solvent to dissolve the grease so that when the solvent is withdrawn it carries enough of the grease with it to bring the skins into a condition for tanning to produce strong leather.

In testimony whereof I affix my signature.

CHARLES CLEMENT KROUSE.